US010450179B2

(12) United States Patent
Sorbi

(10) Patent No.: US 10,450,179 B2
(45) Date of Patent: Oct. 22, 2019

(54) SYSTEM AND METHOD FOR SYNCHRONIZATION OF A CONTAINER FORMING MACHINE AND A CONTAINER PROCESSING MACHINE IN A CONTAINER PROCESSING PLANT

(71) Applicant: SIDEL PARTICIPATIONS, Octeville-sur-Mer (FR)

(72) Inventor: Federica Sorbi, Parma (IT)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/995,343

(22) Filed: Jun. 1, 2018

(65) Prior Publication Data
US 2018/0346307 A1    Dec. 6, 2018

(30) Foreign Application Priority Data
Jun. 2, 2017    (EP) .................................... 17305654

(51) Int. Cl.
*B67C 7/00*        (2006.01)
*B65G 29/00*    (2006.01)
(Continued)

(52) U.S. Cl.
CPC .......... *B67C 7/0013* (2013.01); *B29C 49/062* (2013.01); *B29C 49/421* (2013.01);
(Continued)

(58) Field of Classification Search
CPC ... B29C 49/421; B29C 49/78; B29C 49/4236; B29C 49/06; B29C 49/4273;
(Continued)

(56) References Cited

U.S. PATENT DOCUMENTS 3,613,585 A * 10/1971 Dubroff ................... F42B 12/10
102/476
8,978,873 B2 * 3/2015 Shimomura ........... B65G 43/10
198/464.1
(Continued)

FOREIGN PATENT DOCUMENTS

DE        19928325        12/2000
DE    102007005489 A1 *    7/2007 ............. B29C 49/78
(Continued)

OTHER PUBLICATIONS

European Search Report from corresponding EP Application No. 17305654.0 dated Nov. 8, 2017 (2 pages).

*Primary Examiner* — Mark A Deuble

(57) ABSTRACT

A synchronization system for a container-processing plant, including a container-forming machine configured to form a container, the container-forming machine having a first rotating wheel for rotating the container about a first rotation axis; a container-filling machine operatively coupled to the container-forming machine and configured to fill the container, the container-filling machine having a second rotating wheel for rotating the container about a second rotation axis; and at least one electric motor configured to cause the first rotating wheel and the second rotating wheel to rotate, the synchronization system comprising: a position sensor provided in the container-forming machine and configured to detect a rotating position of the first rotating wheel and to generate a position detection signal; at least one control unit configured to: receive information associated with the position detection signal; synchronize the rotation of the second rotating wheel to the rotation of the first rotating wheel based on the information associated with the position detection signal; and synchronize the rotation of the container-forming machine and container-filling machine from a zero speed up to a full operating speed of the container forming machine (Continued)

at which processing operations are designed to be performed.

20 Claims, 3 Drawing Sheets

(51) Int. Cl.
*B29C 49/42* (2006.01)
*B65G 47/84* (2006.01)
*B29C 49/06* (2006.01)
*B29C 49/78* (2006.01)
*B67C 3/00* (2006.01)
*G05B 19/4062* (2006.01)
*B29C 49/00* (2006.01)
*B67C 3/22* (2006.01)

(52) U.S. Cl.
CPC ...... B29C 49/4205 (2013.01); B29C 49/4236 (2013.01); B29C 49/78 (2013.01); B65G 29/00 (2013.01); B65G 47/846 (2013.01); B67C 3/007 (2013.01); G05B 19/4062 (2013.01); *B29C 49/06* (2013.01); *B29C 49/4273* (2013.01); *B29C 2049/0094* (2013.01); *B67C 2003/227* (2013.01); *G05B 2219/50193* (2013.01)

(58) Field of Classification Search
CPC ........ B29C 2049/0094; G05B 19/4062; G05B 2219/50193; B67C 7/0013; B67C 3/007; B67C 2003/227; B65G 49/062; B65G 49/4205; B65G 29/00; B65G 47/846; B65G 47/847; B65G 47/848
USPC ..................... 198/459.2, 608, 571, 575, 576
See application file for complete search history.

(56) References Cited

U.S. PATENT DOCUMENTS

| | | | |
|---|---|---|---|
| 2005/0104263 A1* | 5/2005 | Larsen | B29B 11/12 264/542 |
| 2005/0121104 A1* | 6/2005 | Monzel | B65G 47/846 141/144 |
| 2009/0208601 A1* | 8/2009 | Shimomura | G05B 19/4062 425/150 |
| 2011/0289883 A1* | 12/2011 | Neubauer | B67C 7/0013 53/167 |
| 2013/0140745 A1* | 6/2013 | Preckel | B29D 22/003 264/454 |
| 2017/0015540 A1* | 1/2017 | Zoni | B65C 3/26 |

FOREIGN PATENT DOCUMENTS

| | | |
|---|---|---|
| EP | 2090949 A2 | 8/2009 |
| EP | 2090949 A3 | 8/2009 |
| EP | 2735538 | 5/2014 |
| GB | 2140175 | 11/1984 |
| WO | WO 2006/097796 A2 | 9/2006 |
| WO | WO 2006/097796 A3 | 9/2006 |

* cited by examiner

SYSTEM AND METHOD FOR SYNCHRONIZATION OF A CONTAINER FORMING MACHINE AND A CONTAINER PROCESSING MACHINE IN A CONTAINER PROCESSING PLANT

CROSS-REFERENCE TO RELATED PATENT APPLICATIONS

This application claims the benefit of European Application No. 17305654.0, filed Jun. 2, 2017. The entire contents of the above-referenced application are expressly incorporated herein by reference

TECHNICAL FIELD

The present invention relates to a system and method for synchronization of a container forming machine and a container processing machine in a container processing plant.

In particular, the following discussion will make explicit reference, without this implying any loss of generality, to a combined bottling plant for packaging fluid products in bottles or similar containers, and to the synchronization of rotating motions of at least two machines of the combined bottling plant, in particular a blowing (or blow moulding) machine used for the formation of containers, by stretch blow moulding of preforms made e.g. of thermoplastic material, and a filling machine for filling the formed containers with a fluid product, e.g. a food product.

BACKGROUND

A combined bottling plant includes a number of cooperating processing machines, performing a number of corresponding operations, such as (but not limited to) forming, filling, sterilising, labelling and capping of containers, for example plastic bottles.

Each machine generally includes a main rotating wheel (or carousel), carrying along its periphery a number of processing units performing processing operations on a respective number of containers.

The various processing machines are arranged in a desired operating sequence, at a close distance one with respect to the other, and conveying or transfer assemblies, each including a number of transfer star wheels or analogous conveying elements, allow transfer of the containers between the various processing machines, through the required operating sequence.

During regular operation, it is required to achieve synchronization between the rotary motions of two or more machines in the processing plant, e.g. the blowing and filling machines, meaning that the machines are operatively coupled to operate in synchronization with respect to their rotary position around a respective axis of rotation and the speed of rotation expressed as number of containers processed per unit time.

A known solution for achieving synchronization is diagrammatically depicted in FIG. 1, which shows a container-processing plant 1 including: a container-forming machine, e.g. a blowing machine 2; and a processing machine, e.g. a filling machine 4, operatively coupled to the blowing machine 2 to fill containers that have been previously formed by the same blowing machine 2.

Blowing and filling machines 2, 4 include: a respective main rotating wheel (or carousel) 5, carrying (in a manner not shown) a number of processing units designed to perform processing operations on a corresponding number of containers; a respective electric motor 6, in particular an asynchronous electric motor, designed to cause rotation of the respective rotating wheel 5 via a rotating shaft 7; and a respective control unit 8, including a PLC (Programmable Logic Controller) 9 or similar computing unit, operatively coupled to the respective electric motor 6 and providing suitable control and power supply signals thereto, in order to control the rotary motion of the respective rotating wheel 5.

In particular, for synchronization of their rotating motion, blowing and filling machines 2, 4 further include: a respective sensing wheel 10, having a toothed rim, arranged below the rotating wheel 5 and coupled to the same rotating shaft 7 so as to rotate therewith; and a respective synchronization optical sensor 11, in particular a photocell sensor, operatively coupled to the sensing wheel 10.

The synchronization optical sensors 11 of the blowing and filling machines 2, 4 are configured to generate a respective pulse-train synchronization signal S1, S2, wherein each pulse corresponds to detection, by the respective sensor, of a tooth of the respective sensing wheel 10 during rotation of the same sensing wheel 10.

The synchronization signals S1, S2 are received by a synchronization module 12 of the control unit 8 of the filling machine 4, which is programmed to process the same synchronization signals S1, S2 and to control the respective electric motor 6 to achieve synchronization with the motion of the blowing machine 2. In particular, the synchronization module 12 suitably modifies the speed of the rotary motion of the respective rotating wheel 5, until the pulses in the synchronization signals S1, S2 are synchronized (i.e. until the edges, e.g. the rising edges, of corresponding pulses of the synchronization signals S1, S2 occur substantially at a same instant of time).

According to this solution, the synchronization process requires motion of both machines, blowing and filling machines 2, 4, at a synchronization speed, whose value is suitably set so as to achieve a sufficient resolution of the synchronization optical sensors 10; this synchronization speed is lower than a full operating speed of the rotating wheels 5, at which the blowing and filling machines 2, 4 are configured to perform the respective forming and filling operations on the preforms/containers.

The present Applicant has realized that the above synchronization solution has some drawbacks, which do not allow to fully exploit its advantages, in particular in case of faults in the container-processing plant 1. Faults that may occur during operation are e.g. formation of defective containers, or destroying of containers due to an excessive pressure applied during the filling operations or due to defects in the formation of the same containers.

In the event of a fault occurring in the processing plant 1, operation of the blowing and/or filling machine 2, 4 is interrupted, in order to address and solve the issue. Once the fault is removed, operation of the blowing and/or filling machine 2, 4 is resumed and synchronization between the same blowing and/or filling machine 2, 4 has to be once again achieved.

The present Applicant has realized that using the above discussed solution entails a rather long time for achieving synchronization, in particular due to the fact that: if the filling machine 4 is stopped, at the restart of the operation, the blowing machine 2 has to slow down to the synchronization speed, at which synchronization may be achieved, before the speed ramps up to the full operating speed for both blowing and filling machines 2, 4; conversely, if the blowing machine 2 is stopped, also the filling machine 4 is stopped, and, at the restart of the operation, both the filling and the blowing machines 2, 4 have to reach the synchronization speed, so as to achieve synchronization, before the speed may ramp up to the full operating speed for both machines.

The need is therefore felt for a synchronization solution allowing to achieve a more efficient synchronization between the machines in the container-processing plant, in particular allowing to decrease the time needed for the synchronization process, particularly at restart of the processing operations after a fault has occurred.

BRIEF SUMMARY

The aim of the present invention is consequently to address the above need, and in particular to provide an improved solution for synchronizing the rotary motions of different machines in a container-processing plant.

According to the present invention, a synchronization system and method are provided, as defined in the annexed claims.

BRIEF DESCRIPTION OF THE DRAWINGS

For a better understanding of the present invention, preferred embodiments thereof are now described, purely by way of a non-limiting example, with reference to the attached drawings, wherein.

DETAILED DESCRIPTION

Figure 1:
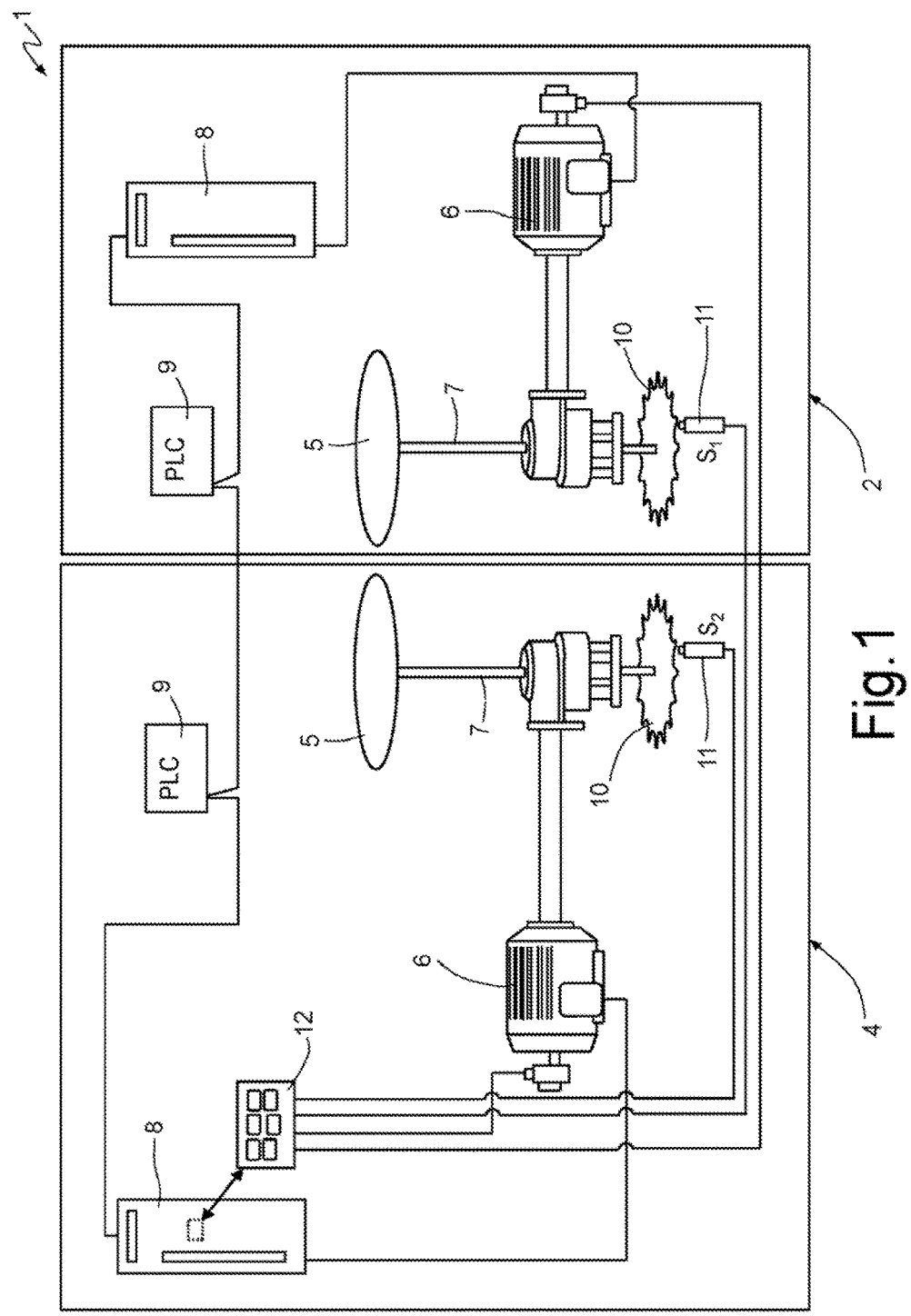
FIG. 1 shows a diagrammatic depiction of a known solution to achieve synchronization between a blowing machine and a filling machine in a combined bottling plant for formation and filling of containers.
Figure 2:
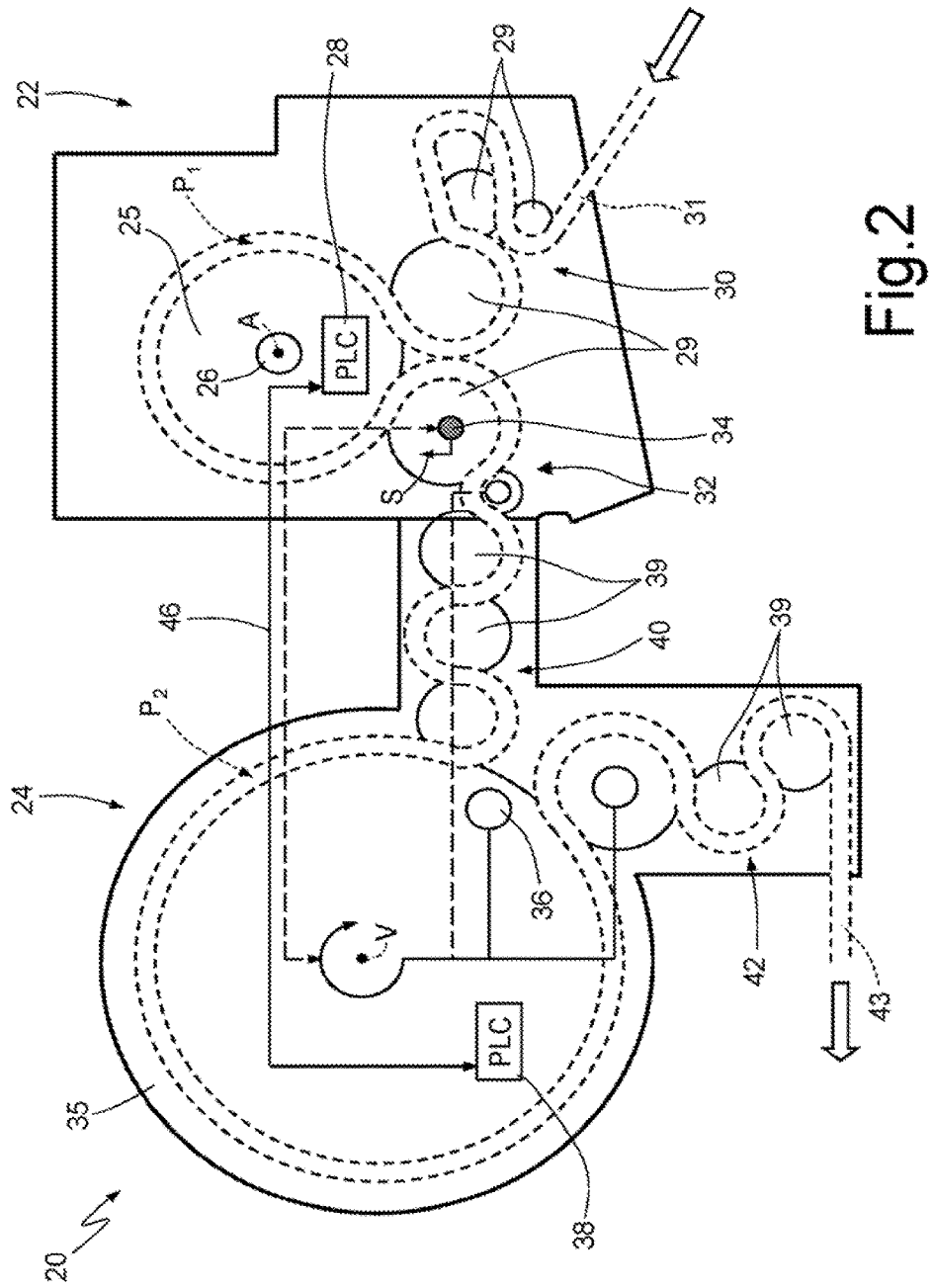
FIG. 2 is a schematic block diagram of a container-processing plant provided with a synchronization system according to the present solution.

FIG. 2 schematically shows a combined container-processing plant 20, including a container-forming machine 22, in particular a blowing machine 22, which receives at its input preforms and provides at its output formed containers, e.g. bottles; and at least one container-processing machine, in particular a filling machine 24, which receives at its input the formed containers from the blowing machine 22, fills the containers with a liquid product according to a desired filling recipe, and outputs the filled containers making them available for successive processing steps (e.g. for sterilizing, labelling and/or capping operations by respective further processing machines of the same container-processing plant 20).

The blowing machine 22 comprises: a main rotating wheel (carousel) 25, defining a circular processing path P1 for the preforms/containers being processed; a main electric motor 26, for example an asynchronous motor, which is coupled to the main rotating wheel 25 via a physical shaft and is controlled to drive the rotating motion of the same main rotating wheel around a first axis A; and a main control unit 28, including a PLC (Programmable Logic Controller) or similar computing unit, programmed to control the main electric motor 26 to cause the rotation of the main rotating wheel 25 and to control the container-forming operations.

The blowing machine 22 further comprises a number of transfer wheels (or star wheels) 29, each rotating around a respective axis of rotation and carrying the articles (preforms/formed containers) to be transferred along their periphery (at respective seats, in a known manner, here not discussed in details); in a manner not shown, the blowing machine 22 may instead include a combination of star wheels and linear conveyors, e.g. belt, air or chain conveyors. Each star wheel 29 may be provided with a respective electric motor, to drive its rotary motion, being controlled by the main control unit 28 or by a local control unit (here not shown) suitably coupled to the same main control unit 28.

A number of input transfer wheels 29 define an inlet conveyor assembly 30, receiving preforms from an input line 31; and a number of output transfer wheels 29 define an outlet conveyor assembly 32, for transferring the formed containers from the upstream blowing machine 22 to the downstream filling machine 24. In a manner here not shown, inlet and outlet conveyor assemblies 30, 32 may also be selectively configurable in order to define alternative paths for the articles to be transferred to and/or from accumulation reservoirs or discharge paths (in a known manner, here not shown in detail).

The blowing machine 22 further includes a position sensor 34, in particular a position encoder 34, more particularly an absolute position encoder, arranged and configured to detect position information indicative of the rotating motion of the same blowing machine 22 (in particular of the main rotating wheel 25 thereof), generating a corresponding position detection signal S. The position sensor 34 may be coupled to the main rotating wheel 25, or, as in the shown embodiment, to one of the transfer wheels 29, in the example to a transfer wheel 29 of the outlet conveyor assembly 32; in particular, the position sensor 34 may be coupled to a brushless electric motor of this transfer wheel 29 of the outlet conveyor assembly 32.

Detection signal S may be provided to the main control unit 28 of the blowing machine 22, in order to implement a position feedback control of the operation of the electric motor 26.

Figure 3:
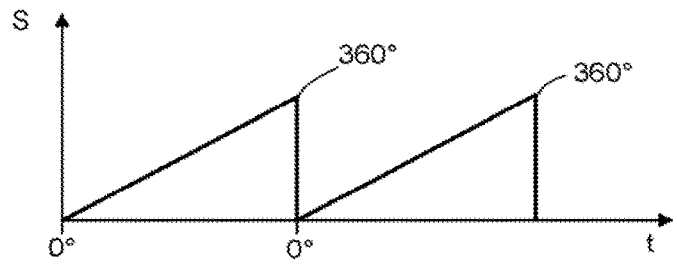
FIG. 3 is a plot of an encoder position signal in the system of FIG. 2.

FIG. 3 shows the detection signal S generated by the position sensor 34, in the example including a plurality of linear-increasing ramps, each corresponding to a complete rotation of the main rotating wheel 25 from an initial position around the first axis A (0°) and a final position around the same first axis A (360°); the value of the detection signal S is at any time indicative of the rotating position of the main rotating wheel 25 around the first axis A, while the slope of the linear ramp of the same detection signal S is indicative of the speed of rotation of the same main rotating wheel 25.

In a substantially corresponding manner, filling machine 24 comprises: a respective main rotating wheel 35, defining a respective circular processing path P2 for the containers being processed and carrying along its periphery a number of processing units (here not shown), each performing processing (i.e. filling) operations on a respective container; a main electric motor 36, in particular a brushless motor, which is coupled to the main rotating wheel 35 and is controlled to drive the rotating motion of the same main rotating wheel 35; and a control unit 38, including a PLC (Programmable Logic Controller) or similar computing unit, operatively coupled to the main electric motor 36 and programmed to control the container-processing operations, according to the desired plan or recipe.

The filling machine 24 further comprises a number of transfer wheels (or star wheels) 39, each rotating around a respective axis of rotation and carrying the containers to be transferred along their periphery. Each star wheel 39 may be provided with a respective electric motor, in particular a brushless motor, to drive its rotary motion, being controlled by the main control unit 38 or by a local control unit (here not shown), coupled to the same main control unit 38.

In particular, a number of input transfer wheels 39 define an inlet conveyor assembly 40, receiving the formed containers from the blowing machine 22; and a number of output transfer wheels 39 define an outlet conveyor assembly 42, for transferring the filled containers to an outlet line 43 (and possibly to downstream processing machines, here not shown, such as a capping machine or a labelling machine).

According to an aspect of the present solution, the main control unit 38 of the filling machine 24 is coupled to the main control unit 28 of the blowing machine 22, according to a master/slave relation (the main control unit 28 of the blowing machine 22 acting as the "master" and the main control unit 38 of the filling machine 24 acting as the "slave"), via a digital communication bus 46, for example a field bus, operating with an Ethernet protocol, e.g. the Powerlink protocol, arranged and configured to transfer digital signals between the blower machine 22 and the filler machine 24.

In particular, the main control unit 38 of the filling machine 24 is configured to receive information about the rotating position and speed of the main rotating wheel 25 of the same blowing machine 22, as detected by the position sensor 34, the position information being related to the position detection signal S generated by the same position sensor 34; in a possible embodiment, main control unit 38 of the filling machine 24 may directly receive the position detection signal S.

The main control unit 38 of the filling machine 24 is configured to generate a virtual rotation axis V, around which to control the rotation of the main rotating wheel 35 of the same filling machine 24; the physical axes of rotation of the main rotating wheel 35 and transfer wheels 39 of the filling machine 24 being coupled and tracking this virtual rotation axis V.

According to an aspect of the present solution, the virtual rotation axis V may be associated to the position sensor 34, i.e. being generated by the main control unit 38 based on the information about the rotating position of the main rotating wheel 25 of the blowing machine 22 provided by the same position sensor 34.

In particular, the main control unit 38 of the filling machine 24 is programmed and configured to implement a first, so called standalone, operating mode, whereby the operation of the same filling machine 24 is controlled and run independently from the blowing machine 22, so that the main control unit 38 of the filling machine 24 manages directly operation start/stop commands and speed references, controlling the main electric motor 36, without considering (or disregarding) the information about the rotating position of the main rotating wheel 25 of the blowing machine 22 provided by position sensor 34.

In this first operating mode, the filler virtual axis V is generated by the main control unit 38 of the filling machine 24 independently from the rotating motion of the blowing machine 22 (i.e. independently of the position information associated to the detection signal S generated by position sensor 34).

According to a particular aspect of the present solution, the main control unit 38 of the filling machine 24 is further programmed and configured to implement a second, so called coupled, operating mode, whereby operation of the same filling machine 24 (acting as "slave") is synchronized with the operation of the blowing machine 22 (acting as "master"). In this operating mode, the blowing machine 22 manages the operation start/stop commands and speed references, and suitable position/speed information are transmitted to the main control unit 38 of the filling machine 24 via the digital communication bus 46; in particular these information are associated to the detection signal S generated by position sensor 34 and are used by the main control unit 38 of the filling machine 24 to obtain an indication of the rotating position and speed of the main rotating wheel 25 of the blowing machine 22 around the first axis A.

In this coupled mode, the filler virtual axis V is generated by the main control unit 38 of the filling machine 24 so as to be coupled to the rotating motion of the blowing machine 22 (as indicated by the dashed line in FIG. 2), using the information associated to the detection signal S generated by position sensor 34.

Moreover, the transfer wheels 39 driven by the main control unit 38 of the filling machine 24 can thus be moved coupled to the main rotating wheel 35 of the same filling machine 24; coupled to the main rotating wheel 25 of the blowing machine 22; or can be stopped in a safe mode. In particular, thanks to the possibility of having independent safety areas, the blowing and filling machines 22, 24 can even be cleaned, changed-over or subjected to other maintenance operations at a same time.

According to a particular aspect of the present solution, thanks to the above discussed arrangement, synchronization of the blowing and filling machines 22, 24 can be achieved at any speed, from (and including) zero speed, up to full processing speed (i.e. the high speed at which processing, formation or filling, operations are designed to be performed); in particular, it is possible to achieve motion synchronization even when one or both machines are still (i.e. at zero speed), and/or when one or both machines are at the full processing speed. In other words, synchronization does not require operating the machines at a specific synchronization speed, having a value that is lower than the processing speed.

In particular, the position sensor 34 maintains the position information detected at the stopping of the blowing machine 22, so that the control unit 38 of the filling machine 24 is able to synchronize with respect to the blowing machine 22 based on the maintained information even at zero speed of the same blowing machine 22; moreover, position sensor 34 is able to accurately detect the rotating position even at high speed, so that the control unit 38 of the filling machine 24 is able to synchronize with respect to the blowing machine 22 also at full processing speed.

In particular, synchronization at zero speed allows the possibility to synchronize the filling machine 24 to the blowing machine 22, without moving the same blowing machine 22; this in turn allows, as will be readily appreciated to a person skilled in the field, the two machines to run synchronized with operator's protection open for testing purposes (so called "jog run"). This feature allows to access the container transfer zone between the machines with operator's protection open and the machines running synchronized, to check and easily set-up the container transfer parameters.

Moreover, synchronization of the filling machine 24 to the blowing machine 22 at zero or at high speed (e.g. at the full operating speed) allows an improved management of the restart of processing operations after a fault has occurred in one of the blowing and filling machines 22, 24.

Figure 4:
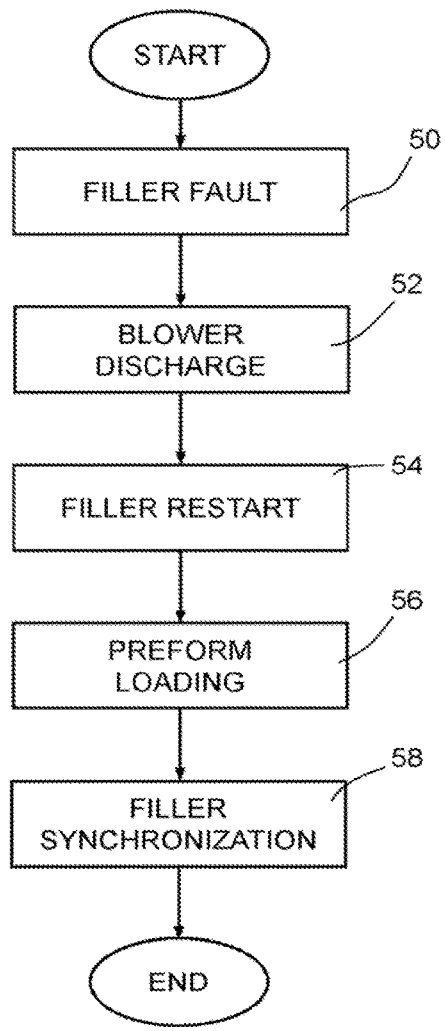
FIGS. 4-5 are flow diagrams of operations performed according to a synchronization method implemented in the system of FIG. 2.

In this respect, FIG. 4 shows an exemplary synchronization algorithm for synchronization of the filling machine 24 to the blowing machine 22 at high speed, after a fault in the filling machine 24, causing a stop of the rotating motion of the same filling machine 24, has occurred, step 50.

After the fault is detected, main control unit 24 of the blowing machine 22 controls discharge of the preforms and containers from the main rotating wheel 25, at step 52. It is indeed known that, once the plant restarts after an operating fault, the preforms present in the blowing machine 22 are no longer suitable for subsequent processing, e.g. due to the fact that they were subjected to temporary cooling or being kept too long in a heating device of the same machine, and therefore must be discharged and disposed of, or recycled.

The main control unit 24 does not, however, commands a stop or a slowing down of the main rotating wheel 25, at a speed lower than the full operating speed (in other word, the blowing machine 22 continues its run at full processing speed).

After the fault in the filling machine 24 has been suitably taken care of, the main control unit 38 of the same filling machine 24 signals the availability for restart of the operations and for synchronization, at step 54.

Accordingly, preforms are loaded again in the main rotating wheel 25 of the blowing machine 22 (that is still running at the full operating speed), at step 56, and the filling machine 24 restarts its rotating motion.

In particular, the main control unit 38 of the filling machine 24 then controls, step 58, the synchronization at high speed, i.e. at the full operating speed, to the motion of the blowing machine 22, using the information associated to the position detection signal S coming from the position sensor 34 of the same blowing machine 22 to determine the rotating position and speed of the main rotating wheel 25 of the blowing machine 22 around the first axis A. In particular, the filler virtual axis V is generated based on these information, and the rotating motions of the main rotating wheel 35 and the transfer wheels 39 of the filling machine 24 is coupled to the same virtual axis V, to achieve synchronization of filling machine 24 to the blowing machine 22.

Tests performed by the present Applicant have shown the possibility to save time, e.g. up to 100 s, using the discussed algorithm, with respect to traditional solutions, that would instead envisage synchronization at a low synchronization speed, and thus first slowing down of the blowing machine 22 to the required low synchronization speed and then subsequent ramp-up of the speed of the same blowing machine 22 to the full operating speed.

Figure 5:
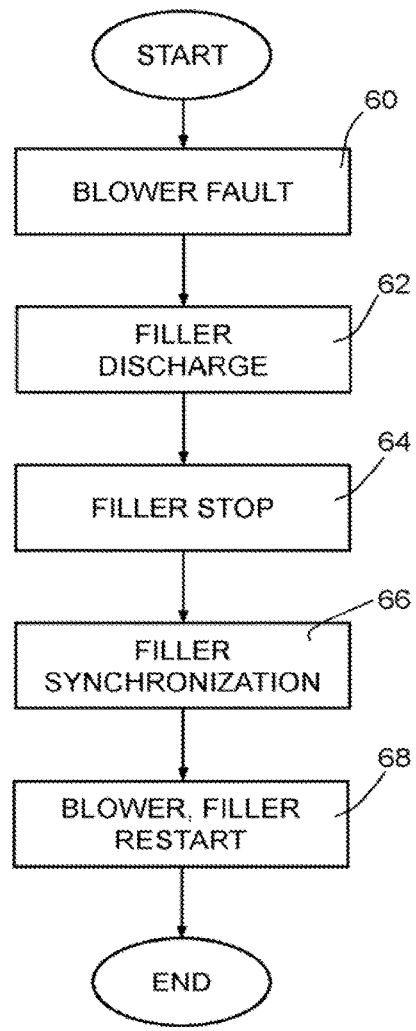

FIG. 5 shows a further synchronization algorithm, again for synchronization of the filling machine 24 to the blowing machine 22 at high speed, this time after a fault in the blowing machine 22, causing a stop of the rotating motion of the same blowing machine 22, has occurred, at step 60.

After the fault has been detected, main control unit 38 of the filling machine 24 controls discharge of the containers present on the main rotating wheel 35, at step 62.

Afterwards, the same main control unit 38 of the filling machine 24 commands a stop of the rotating motion of the main rotating wheel 35, at step 64.

After the fault in the blowing machine 22 has been suitably taken care of, the main control unit 38 of the filling machine 24 controls, at step 66, the synchronization to the motion of the blowing machine 22, at zero speed of the main rotating wheel 25 of the same blowing machine 22.

The main control units 28, 38 of the blowing and filling machines 22, 24 then control restart of the respective rotating motions and ramp-up to the full operating speed, at step 68; blowing and filling machines 22, 24 thus reach the full operating speed in a synchronized state, again without the need to first reach a lower synchronization speed.

Also in this case, tests performed by the present Applicant have shown the possibility to save time, e.g. up to 30 s, using the discussed algorithm, with respect to traditional solutions, that would envisage synchronization at a low synchronization speed, and then subsequent ramp-up of the speed of the blowing machine 22 and filling machine 24 to the full operating speed.

The advantages that the described solution allows to achieve are clear from the foregoing description.

In particular, it is again underlined that this solution allows to achieve improved and more efficient synchronization between different machines in a container-processing plant (e.g. between a blowing and a filling machine), particularly allowing to decrease the time needed for the synchronization process, especially at the restart of the operations after a fault has occurred in at least one of the machines.

The synchronization solution thus allows to improve the throughput of the container-processing plant.

Finally it is clear that modifications and variations may be applied to the system described and shown, without departing from the scope defined by the appended claims.

In particular, it is underlined that the discussed synchronization solution may be applied also in the case where a greater number of machines are to be synchronized, e.g. in a container-processing plant including further processing machines, such as a sterilizing machine, a labelling machine and/or a capping machine, in addition to, or substitution of, the blower and filler machines.

In general, the described synchronization system and method may be advantageously employed in any case where two, or more, rotating machines are to be synchronized in a processing plant.

Moreover, the type and configuration of the elementary parts of the bottling plant, previously shown and discussed, are to be considered only as exemplary: e.g. the electric motors could be of a different kind, so as the position sensors, that could include any kind of sensor able to track the position of a corresponding rotating wheel with respect to the respective rotating axis.

The invention claimed is:

1. A synchronization system for a container-processing plant, including a container-forming machine configured to form a container, the container-forming machine having a first rotating wheel for rotating the container about a first rotation axis; a container-filling machine operatively coupled to the container-forming machine and configured to fill the container, the container-filling machine having a second rotating wheel for rotating the container about a second rotation axis; and at least one electric motor configured to cause the first rotating wheel and the second rotating wheel to rotate, the synchronization system comprising:
    a position sensor provided in the container-forming machine and configured to detect a rotating position of the first rotating wheel and to generate a position detection signal;
    at least one control unit configured to:
        receive information associated with the position detection signal;
        synchronize the rotation of the second rotating wheel to the rotation of the first rotating wheel based on the information associated with the position detection signal; and synchronize the rotation of the container-forming machine and container-filling machine from a zero speed up to a full operating speed of the container forming machine at which processing operations are designed to be performed.

2. The system according to claim 1, wherein the position sensor is an absolute encoder, and the at least one electric motor is a brushless motor.

3. The system according to claim 1, wherein the at least one control unit is configured to synchronize the rotation of the container-filling machine with respect to the container-forming machine at the zero speed of the container-forming machine, so as to allow the container-forming machine and the container-filling machine to run synchronized during a testing procedure.

4. The system according to claim 1, wherein the at least one control unit is configured to synchronize the rotation of the container-filling machine with respect to the container-forming machine at the zero speed of the container-forming machine, during restart of the processing operations after a fault has been detected at the container-forming machine.

5. The system according to claim 1, wherein the at least one control unit is configured to synchronize the rotation of the container-filling machine with respect to the container-forming machine at the full operating speed, during restart of the processing operations after a fault has been detected at the container-filling machine.

6. The system according to claim 1, wherein the information associated with the position detection signal includes a position and a speed of rotation of the first rotating wheel around the first rotation axis.

7. The system according to claim 1, wherein the container-filling machine further includes a number of transfer star wheels designed to transfer containers and operatively coupled to the second rotating wheel, and wherein the at least one control unit is configured to generate a virtual rotation axis based on the information associated with the position detection signal, and to control rotation of the second rotating wheel and the transfer star wheels according to the generated virtual rotation axis.

8. The system according to claim 1, wherein the at least one control unit includes a first control unit associated with the container-forming machine and a second control unit associated with the container-filling machine, and the system further comprising a digital coupling bus, coupling the first and second control units and carrying the information associated to the position detection signal.

9. The plant according to claim 1, wherein the at least one control unit is configured to synchronize the rotation of the container-filling machine with respect to the container-forming machine at the zero speed of the container-forming machine, so as to allow the container-forming machine and the container-filling machine to run synchronized during a testing procedure.

10. The plant according to claim 1, wherein the at least one control unit is configured to synchronize the rotation of the container-filling machine with respect to the container-forming machine at the zero speed of the container-forming machine, during restart of the processing operations after a fault has been detected at the container-forming machine.

11. The plant according to claim 1, wherein the at least one control unit is configured to synchronize the rotation of the container-filling machine with respect to the container-forming machine at the full operating speed, during restart of the processing operations after a fault has been detected at the container-filling machine.

12. A synchronization method for a container-processing plant, including a container-forming machine configured to form a container, the container-forming machine having a first rotating wheel for rotating the container about a first rotation axis; a container-filling machine operatively coupled to the container-forming machine and configured to fill the container, the container-filling machine having a second rotating wheel for rotating the container about a second rotation axis; at least one electric motor configured to cause the first rotating wheel and the second rotating wheel to rotate; and a position sensor provided in the container-forming machine and configured to detect a rotating position of the first rotating wheel and to generate a position detection signal; the method comprising:
synchronizing, by at least one control unit, the rotation of the second rotating wheel to the rotation of the first rotating wheel based on information associated to the position detection signal, the synchronization being performed from a zero speed, up to a full operating speed at which processing operations are designed to be performed.

13. The method according to claim 12, comprising synchronizing, by the at least one control unit, the rotation of the second rotating wheel with respect to the rotation of the container-forming machine, at the zero speed of the container-forming machine, so as to allow the container-forming machine and the container-filling machine to run synchronized during a testing procedure.

14. The method according to claim 12, comprising synchronizing, by the at least one control unit of the container-filling machine, the rotation of the second rotating wheel with respect to the rotation of the container-forming machine, at the zero speed of the container-forming machine, during restart of the processing operations after a fault has been detected at the container-forming machine.

15. The method according to claim 14, comprising:
after detecting a fault in the container-forming machine, controlling discharge of containers from the second rotating wheel;
stopping operation of the container-filling machine;
after the fault in the container-forming machine has been corrected, synchronizing at the zero speed of the container-forming machine, the rotation of the container-filling machine to the motion of the container-forming machine, using the information associated with the position detection signal from the position sensor of the container-forming machine; and
restarting operation of the container-forming machine (22) and the container-filling machine and controlling synchronized ramp-up to the full operating speed.

16. The method according to claim 12, comprising synchronizing, by the at least one control unit, the rotation of the respective second rotating wheel with respect to the rotation of the container-forming machine, at the full operating speed, during restart of the processing operations after a fault has been detected at the container-filling machine.

17. The method according to claim 16, wherein the container-forming machine is a blow-moulding machine configured to form containers starting from preforms; the method further comprising:
after detecting a fault in the container-filling machine, controlling discharge of preforms and containers from the first rotating wheel of the container-forming machine, which continues to run at the full operating speed;
after the fault in the container-filling machine has been corrected, restarting operation of the container-filling machine, and loading again preforms on the first rotating wheel of the container-forming machine;

synchronizing at the full operating speed, the rotation of the container-filling machine to the motion of the container-forming machine, using the information associated with the position detection signal from the position sensor of the container-forming machine.

18. The method according to claim 12, wherein the information associated to with the position detection signal includes a position and a speed of rotation of the first rotating wheel around the first rotation axis.

19. The method according to claim 12, wherein the container-filling machine further includes a number of transfer star wheels designed to transfer containers, coupled to the second rotating wheel; the method comprising generating a virtual rotation axis based on the information associated with the position detection signal and controlling rotation of the second rotating wheel and the transfer star wheels according to the generated virtual rotation axis.

20. A container-processing plant comprising:

a container-forming machine configured to form a container, the container-forming machine having a first rotating wheel for rotating the container about a first rotation axis;

a container-filling machine operatively coupled to the container-forming machine and configured to fill the container, the container-filling machine having a second rotating wheel for rotating the container about a second rotation axis;

at least one electric motor configured to cause the first rotating wheel and the second rotating wheel to rotate, the synchronization system comprising:

a position sensor provided in the container-forming machine and configured to detect a rotating position of the first rotating wheel and to generate a position detection signal;

at least one control unit configured to:

receive information associated with the position detection signal;

synchronize the rotation of the second rotating wheel to the rotation of the first rotating wheel based on the information associated with the position detection signal; and synchronize the rotation of the container-forming machine and container-filling machine from a zero speed up to a full operating speed of the container forming machine at which processing operations are designed to be performed.

* * * * *